United States Patent [19]

Koelewijn

[11] 3,928,504

[45] Dec. 23, 1975

[54] DYEABLE POLYPROPYLENE COMPOSITIONS CONTAINING A POLYAMINE ADDUCT

[75] Inventor: Pieternella Koelewijn, Amsterdam, Netherlands

[73] Assignee: Shell Oil Company, Houston, Tex.

[22] Filed: Dec. 6, 1974

[21] Appl. No.: 530,104

[30] Foreign Application Priority Data
Dec. 12, 1973 United Kingdom............... 57564/73

[52] U.S. Cl.............. 260/897 B; 8/21 D; 8/DIG. 7; 8/DIG. 9; 260/42.22; 260/876; 260/889; 260/897 R; 264/78
[51] Int. Cl.² ........................................ C08L 23/12
[58] Field of Search................................... 260/897

[56] References Cited
FOREIGN PATENTS OR APPLICATIONS
2,149,512   3/1973   France................................ 260/897
1,005,638   9/1965   United Kingdom................. 260/897

*Primary Examiner*—Carman J. Seccuro

[57] ABSTRACT

This invention relates to an improved dyeable polypropylene composition comprising a polypropylene and a polyamine adduct or salt thereof of a halogenated isotactic polypropylene having at least 25 carbon atoms and a polyamine group. The invention also relates to articles made from the improved dyeable polypropylene composition. This improved composition has better dyebath exhaustion characteristics, requires less amine adduct and is less sticky than compositions using known amine adducts.

9 Claims, No Drawings

DYEABLE POLYPROPYLENE COMPOSITIONS CONTAINING A POLYAMINE ADDUCT

BACKGROUND OF THE INVENTION

1. Field of the Invention

The present invention relates to improved dyeable polypropylene composition and articles.

2. Description of Prior Art

It is known that polyolefins, such as crystalline polypropylene and polyethylene, may be molded into fibers, films and other shaped articles possessing excellent physical and mechanical properties. These polyolefins alone, however, cannot be adequately dyed using conventional dyeing methods and dyestuffs. For this reason, much study has been done for many years to improve the affinity of polyolefins for dyestuffs and a number of means have been heretofore proposed.

A commonly used method to improve the dyeability is the incorporation in the polyolefin of other more dye-receptive polymers or copolymers, thus making a dyeable polyolefin composition. For example, British Pat. No. 893,604 which issued Apr. 11, 1962, teaches the incorporation of a polyalkylene imine and amine dispersing agents as dye improvers, British Pat. No. 1,111,837 which issued May 1, 1965, describes a system which employs alkyl substituted succinimides, and U.S. Pat. No. 3,112,981 which issued Dec. 3, 1963 describes a process which involves treating the polypropylene with an aliphatic amine then a dilute aqueous acid. Another polyolefin composition which exhibits improved dyeability, particularly by acid dyes, has been reported in U.S. Pat. No. 3,395,198 which issued July 30, 1968, and comprises a copolymer of ethylene and an aminoalkyl acrylate and the polyolefin. Although the addition of this copolymer does improve the dyeability of the polyolefin composition without unduly impairing the physical properties thereof, such an additive can be rather costly, especially since rather large amounts (about 10%) have to be incorporated in order to achieve adequate dyeability. Another disadvantage associated with the use of most dye-receptive polymers, such as e.g., the above ethylene/aminoalkyl acrylate copolymer, is the necessity to employ a highly acidic (corrosive) dyebath (pH 2 or less) so as to achieve sufficient bath exhaustion. Also the copolymer possesses a limited thermal stability as a consequence of which spinning and extrusion temperatures have to be carefully controlled.

The use of amine adducts or salts thereof containing long alkyl chains as dye receptors in polyolefins has been claimed (West German patent application DT 2,240,534, published Feb. 2, 1973) as a general method for overcoming the requirement of higher acid concentration. Other polyolefin dye-receptors have required a pH of about 2 but the amine adducts have allowed the pH to be raised to about 4 to 6. This advantage is especially useful for the dying of nylon polypropylene combinations since in order to acid-dye nylon one must use a pH range of about 4 to 6.

While the amine adducts were known to offer this pH advantage, the specific combination of polypropylene and the adduct of a halogenated polypropylene and a polyamine has been found to offer unexpected advantages over the previously known polyolefin/amine adduct compositions.

SUMMARY OF THE INVENTION

An improved, dyeable polypropylene composition has been found which offers a number of advantages over the known dyeable polypropylene compositions. The improved composition comprises a polypropylene and a polyamine (adduct) or salt thereof, the polyamine (adduct) having at least one substantially isotactic polypropylene chain of at least 25 carbon atoms, and preferably at least 50 carbon atoms linked to a nitrogen atom.

The polypropylene/isotactic polypropylene amine adduct composition has the advantage of requiring a less acidic medium for acid-dying than non-polyamine/polyolefin compositions and showing better dye-bath exhaustion characteristics, requiring less amine adduct and showing less stickiness than known polyolefin/polyamine compositions.

DESCRIPTION OF PREFERRED EMBODIMENTS

The polypropylene which is used as the basic component of the present invention is any crystalizable polypropylene. It may have either a substantially syndio- or isotactic structure and may be made by any process capable of producing a crystalizable polypropylene. The preferred polypropylene is the isotactic polypropylene synthesized with the Ziegler-Natta type catalyst.

The polyamine or polyamine adducts used in the composition of this invention contain one or more polyamine groups attached to a substantially isotactic polypropylene group. Each polyamine group contains two or more amino nitrogen atoms, of which at least one is primary, secondary or, in particular, tertiary.

The polyamine groups are derived from aliphatic, cycloaliphatic, aromatic or heterocyclic diamines and higher amines — i.e., amines having two or more amino groups — having generally a molecular weight of less than 300. Preferably the polyamine group is aliphatic. Examples of suitable diamines are ethylene-1,2-diamine, propylene-1,2-diamine, 1,3diaminopropane, the diaminobutanes, 1-(2-aminopropyl)piperazine and benzene-1,4-diamine. A preferred diamine is N,N-dimethyl-1,3-diamopropane. Examples of suitable higher amines are the polyalkylenepolyamines, such as the polethylenepolyamines and the polypropylenepolyamines. Specific examples of the latter class are diethylenetriamine, triethylenetetramine and tetraethylenepentamine.

The polypropylene chain which is attached to the nitrogen atom of the polyamine group is a substantially isotactic polypropylene chain with a molecular weight between about 1000 and about 20,000, preferably between about 1500 and 15000 and most preferably between about 2500 and about 7500.

The polypropylene chain may be derived from a low-molecular-weight isotactic polypropylene having a molecular weight in the range indicated above. Conveniently, however, the polypropylene chain is derived from a high-molecular-weight, substantially isotactic polypropylene which is degraded by methods known in the art, such as by milling, heating or irradiation. A preferred method comprises milling in the absence of oxygen at temperatures between 200° and 600°C. The polypropylene having a molecular weight between 1000 and 20,000 generally has an isotacticity of at least 50%, preferably of at least 60%.

Polyamine adducts containing at least two polyamine groups have been described in British Pat. No.

1,005,638 which issued Sept. 22, 1965. These adducts may be prepared by the reaction of a low-molecular-weight isotactic polypropylene having at least two halogen atoms — in particular chlorine — as substituents and a hydrocarbon chain having a molecular weight of at least 1000, with a polyamine. A halogen atom is replaced by a polyamine group, while hydrogen halide is formed.

An advantageous method of preparation starts from a propylene polymer having a terminal double bond. Chlorination in an inert solvent with a slight excess of the theoretical quantity of chlorine (preferably an excess of 10 – 30%) results in the formation of a substituted allyl chloride while hydrochloric acid is split off. Further chlorination will lead to non-allylic type chlorine substituents. The polyamine adduct is prepared by reacting a polyamine group with the chlorinated polypropylene group formed in the above manner. The alkylation of the amine by the alkylchloride splits off HCl. Polyamine adducts have one or more polyamine groups attached to a polypropylene chain depending upon the number of chlorines attached to the polypropylene and the molar ratio of chlorinated polypropylene and polyamine groups.

A preferred group of polyamine adducts is formed by those wherein at least one monovalent polypropylene chain having a molecular weight of at least 2500 and at least one monovalent hydrocarbon group having at most 10 carbon atoms are bound direct to nitrogen and wherein the number of hydrogen atoms which are bound to nitrogen is smaller than the number of nitrogen atoms present in the polyamine adduct. Particularly suitable adducts contain a tertiary nitrogen atom, such as adducts derived from N,N-dimethyl-1,3-diaminopropane.

The molecular weight (number averaged) of the polyamine adduct is in general at least 1,100 and may be as high as 50,000 or more. A preferred range of molecular weights is from 2,600 to 7,600.

The polyamine adducts may also be used in the form of their salts. The acids from which the salts are derived are organic or inorganic acids such as phosphoric acid, sulphuric acid, p-toluenesulphonic acid, hydrochloric acid and diethyl phosphate.

The polyamine adduct of this invention may be represented by the following formula:

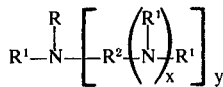

where R is a substantially isotactic polypropylene chain having at least 25 carbon atoms, preferably 50 carbon atoms or more, $R^1$ is R or a hydrogen, alkyl, cycloalkyl, aryl or nitrogen-containing heterocyclic group, $R^2$ is an alkyl, cycloalkyl or aryl group having at least two carbons, no one carbon of $R^2$ being attached to more than one of the indicated nitrogen atom, $x$ is an integer from 0 to 6 inclusive, $y$ is an integer from 1 to 6 inclusive, and the total molecular weight of the nitrogen atoms, $R^2$ and $R^1$ when $R^1$ is not R is less than about 300.

The preferred polyamine adducts of the above formula are those where R is an isotactic polypropylene having a molecular weight of from 2,500 to about 7,500, $R^1$ is a hydrogen or methyl group, $R^2$ is an ethane, propane, butane or benezine group of which no two carbon atoms are attached to more than one of the indicated nitrogens, $x$ is 1 and $y$ is 1.

In order to obtain sufficient dyeability it is desirable that the compositions according to the invention contain at least 0.01 weight percent amino nitrogen, a preferred range of nitrogen contents being from about 0.05 %w to about 0.5 %w inclusive, in particular from about 0.1 %w to about 0.3 %w inclusive. Accordingly, the compositions usually contain at least 2 %w of polyamine adduct, preferably from about 3 %w to about 10 %w inclusive. In order to arrive at the above nitrogen and adduct contents, it is desirable that the adducts themselves have a nitrogen content of at least 1 %w, preferably of about 2 %w to 8 %w inclusive.

In addition to the polyamine adducts or their salts the polypropylene compositions of this invention may contain further additives such as suitable known polypropylene stabilizers, such as antioxidants (e.g., alkylphenol compounds), ultraviolet-absorption inhibitors (e.g., benzophenone derivatives), heat-resisting stabilizers (e.g., the thioether compound of a carboxylic acid ester) and other known useful additives or combination of these without departing from the scope of the present invention.

The polypropylene compositions of this invention can also be modified, according to an embodiment of this invention, to provide polyolefin compositions which are receptive to both disperse and acid type dyes. This requires that 1.0 to 10.0 percent and preferably 1.0 to 5.0 percent, by weight based on the polypropylene, of a terpolymer consisting essentially of acrylonitrile, butadiene and styrene (ABS) be included in the hereinbefore described polypropylene composition. Generally, the characteristics of the ABS terpolymers suitable for use in this invention are described in the Modern Plastics Encyclopedia 1968, September 1967, Vol. 45, No. 1A, McGraw Hill, pp. 111–114. In general it is found that nearly any ABS terpolymer can be used for the purposes of this invention, but for better dyeability, a higher percentage of butadiene is desirable in the ABS. Commercially available ABS products suitable for use in this invention include products available from Marbon, Inc.

Other additives which may also be added include the alkali metal salts of organic acids or hydrochloric acids, a copolymer of ethylene and an alkylaminoalkylacrylate, titanium dioxide, and the like.

The above-mentioned component materials of the present invention may be readily admixed mechanically to prepare a homogeneous composition. The admixing or blending can thus be performed by means of a Banbury mixer or other suitable mixer at elevated temperature or, alternatively, a multi-stage extruding technique may be utilized to perform the required mixing and extrusion at the same time. The compositions may be mill-blended or mixed in the form of a powder or a solution with a polyolefin powder. Dry powdery mixtures may be granulated, if desired. The compositions thus prepared may be used in the manufacture of fibers, films, fabrics and other dyeable articles by known techniques such as meltspinning, film fibrillation and blowmolding. After their manufacture films and fibers are usually stretched at elevated temperatures, such as 100°C, applying stretch ratios between 1:2 and 1:6. Furthermore, it may be advantageous to treat the articles prior to dyeing with acidic agents so as to further enhance dye receptivity. Examples of such agents are hydrochloric acid, phosphoric acid, sulphur dioxide, formic acid and sulphur chloride.

Dyeing may be effected according to methods known in the art. Acid dyes are the most effective, for example, Trimacide Light Red 2 B, Anthrachinon Blue Sky, Palatine Yellow ELNA-CF, Tectilon Red 3 B and Tectilon Blue R. Other suitable dye-stuffs are the premetallized and disperse dye-stuffs, particularly if an ABS terpolymer is included in the polyolefin compositions. Examples of dye-stuffs utilizable in this invention can be found in afore mentioned U.S. Pat. No. 3,395,198.

In the aqueous dye bath emulsified or disperse carriers may be employed such as benzylalcohol, methylester of cresotic acid, a mixture of phenol and trichlorophenol, glycerol esters of fatty acids, and the like. Carriers may be employed in an amount of ½–20 g/l of dye bath. The temperature of the dye bath is generally above 85°C such as about 100°C. If pressure apparatus is available bath temperatures of 100°–150°C may suitably be employed. The pH of the bath is desirably in the range between 2 and 6, in particular between 3 and 5. Dyeing time may vary from 15 minutes to 4 hours. A liquor to goods ratio between 10:1 and 100:1 is suitably employed.

The fibers made from the compositions of this invention, when dyed have high fastness to sunlight, laundering, drycleaning, and other conditions. The homogeneity of the compositions of this invention may be clearly seen when the dyed film is examined with the naked eye or under a microscope or when the dyed fiber bundle is set with epoxy resin and cut and its cross section is microscopically examined. The fact that the compositions of this invention are substantially homogeneous can also become apparent when one considers the fact that the mechanical strength of the products made from the same are almost equal to that of the polypropylene used.

It will be apparent from the above description that the compositions of this invention have improved affinities to dyestuffs, retaining the desirable mechanical properties of polypropylene. It is also to be noted that the compositions are also superior to plain polyolefin in printing qualities. Thus, films or other products made of these compositions can be printed attractively.

Comparisons of dyeability may be made visually with respect to the shades of molded products but, for accuracy, measurements are best carried out by means of optical instruments, or from the amount of dye bath exhaustion. Particularly in the case of fibers, it is usual to take the dye bath exhaustion as criterium.

This invention will be further described with reference to the following Illustrative Embodiments which are given by way of illustration only and not by way of limitation.

ILLUSTRATIVE EMBODIMENT I

To 20 g of polyethylene having a molecular weight ($\overline{M}_v$) of 3200, dissolved in 1000 ml of $CS_2$, 63 mmol of chlorine was added in 10 minutes at 40°C. After a total reaction time of 0.5 hour, the solvent was evaporated. The product obtained had a Cl content of 10.6 %w. To 5 grams thereof, containing 0.1 %w of pentaerythritoltetra-[3-(3,5-di-tert.butyl-4-hydroxyphenyl)] propanoate, 11 g of $Na_2CO_3$ and 10 ml of N,N-dimethyl-1,3-diaminopropane (DAP) were added at 90°C or 120°C. This coupling reaction between DAP and the chlorinated polyethylene was allowed to proceed for 3 hours. The reaction mixture was diluted with heptane and washed at 60°C with water until neutral. The heptane was evaporated. The dried product was powdered and 10 parts by weight (pbw) were mixed with 90 pbw of a polypropylene powder having a melt index of 5.5 dg/minute (at 230°C and a load of 2.16 kg). The mixture was milled and spun at a drawdown ratio of 1000 and a spinning orifice diameter of 0.5 mm. The resulting filament was dyed with "Tectilon Blue R" and "Tectilon Red 3 B" at a liquid/goods ratio of 30/1; pH 3, and a dye concentration of 4 %w (on filament); the temperature was raised from 20°C to 100°C in 0.5 hour, and maintained at 100°C for 1 hour. Further details and results are given in Table I.

Table I

| Example | A | B |
|---|---|---|
| DAP coupling: | | |
| Temperature, °C | 90 | 120 |
| Cl content after coupling, %w | 7.5 | 6.8 |
| N content after coupling, %w | 0.84 | 1.02 |
| Spinning: | | |
| Temperature, °C | 200 | 230 |
| Spinning-head temperature, °C | 210 | 240 |
| Spinning properties | moderate* | moderate |
| The spun filaments had a waxy feel and were slightly colored. | | |
| Dyebath exhaustion: | | |
| "Tectilon Blue R", % | 30 | 45 |
| "Tectilon Red 3 B", % | 25 | 45 |

*at spinning/spinning-head temperatures of 230/240°C this mixture was not spinnable due to decomposition.

ILLUSTRATIVE EMBODIMENT II

The starting material for an adduct was an isotactic polypropylene obtained by thermal degradation at 300°C under nitrogen of polypropylene having a limiting viscosity number of 3.1 dl/g and an ether extractable content of 2 %w. This starting material has a limiting viscosity number of 0.08 dl/g (in decalin at 135°C) — corresponding to a molecular weight ($M_v$) of 3800 — and an isotacticity of 75% according to the so-called pentad signal of the methyl carbon atoms as measured by $^{13}C$-NMR, a method described in Inoue et al. in Die Makromolekulare Chemi, 152 (1972), 15–26. The percentage isotacticity was calculated as the ratio of the integral area of the mmmm-pentad methyl carbon signal, to the integral area of the total of methyl carbon signals.

Substantially as described in the above Illustrative Embodiment I, the degraded product was chlorinated, coupled, blended, spun and dyed. Chlorination was effected in $CCl_4$ at 60°C. Chlorine was added in 10 minutes and the reaction was allowed to proceed for 0.5 hour. Further details are given in Table II.

Table II

| Example | 1 | 2 | 3 |
|---|---|---|---|
| Chlorination: | | | |
| Degraded polypropylene, g | 30 | 20 | 10 |
| $CCl_4$, ml | 1000 | 1000 | 500 |
| Chlorine added, mmol | 94 | 99 | 70 |
| Cl in product, %w | 8.4 | 15.5 | 7.5 |
| Coupling: | | | |
| Time, hours | 3* | 17 | 3 |
| Temperature, °C | 120 | 120 | 120 |
| N in DAP adduct, %w | 3.0 | 5.0 | 4.6 |
| Spinning: | | | |
| %w of DAP adduct, mixed with polypropylene | 10 | 5 | 5 |
| Temperature, °C | 200 | 200 | 200 |
| Spinning-head temperature, °C | 210 | 210 | 210 |

Table II-continued

| Example | 1 | 2 | 3 |
|---|---|---|---|
| Spinning properties | good | good | good |
| Dye-bath exhaustion: | | | |
| "Tectilon Blue R", % | 100 | 80 | 70 |
| "Tectilon Red 3 B", % | 75 | 90 | 85 |

*0.5 %w of tris(nonylphenyl)phosphite added.

During spinning no degradation was observed. The spun yarn was virtually colorless and did not have a waxy feel. With 5% of the DAP adduct in the yarn the color of the dyed product was more brilliant than with 10% of the adduct produced in Illustrative Embodiment I.

I claim as my invention:

1. An improved dyeable polypropylene composition comprising a isotactic polypropylene and a polyamine adduct containing at least two nitrogen atoms having the following formula:

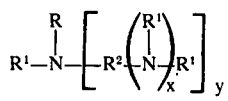

where R is a substantially isotactic polypropylene chain having at least 25 carbon atoms, $R^1$ is R, a hydrogen, alkyl, cycloalkyl, aryl or nitrogen heterocyclic group, $R^2$ is an alkyl, cycloalkyl or aryl group having at least 2 carbons, no one carbon of $R^2$ being attached to more than one nitrogen atom, $x$ is an integer from 0 to 6 inclusive, $y$ is an integer from 1 to 6 inclusive, and the total molecular weight of the nitrogen atoms, $R^2$ and $R^1$ when $R^1$ is not R is less than about 300.

2. The composition of claim 1 wherein R is a polypropylene chain having an isotacticity of at least 60 percent and at least 50 carbon atoms.

3. The composition of claim 2 wherein $R^1$ is a hydrogen or an alkyl group, $R^2$ is an alkyl group and $x$ is an integer from 1 to 6 inclusive.

4. The composition of claim 3 where the

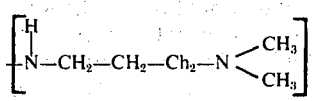

group is $$\left[\begin{matrix}H\\|\\-N-CH_2-CH_2-Ch_2-N\end{matrix}\begin{matrix}CH_3\\<\\CH_3\end{matrix}\right]$$

5. The composition of claim 1 where the polyamine adduct has a number average molecular weight of 1,100 to 50,000.

6. The composition of claim 1 where the polyamine adduct in the composition is such as to provide therein 0.05 to 0.5 weight percent of amino nitrogen based on total composition.

7. The composition of claim 6 wherein the polyamine adduct used in the composition is present in an amount ranging from 3 to 10 weight percent.

8. The composition of claim 7 wherein the polyamine adduct used in the composition contains at least 1 weight percent nitrogen.

9. An improved dyeable substantially isotactic polypropylene composition comprising substantially isotactic polypropylene and a polyamine adduct made from the reaction of N,N-dimethyl-1,3-diaminopropane and a halogenated substantially isotactic polypropylene having a molecular weight between 2,500 and 7,500.

* * * * *